United States Patent
Julicher et al.

(10) Patent No.: US 10,360,164 B1
(45) Date of Patent: Jul. 23, 2019

(54) DIRECT MEMORY ACCESS ADAPTER

(71) Applicant: Microchip Technology Incorporated, Chandler, AZ (US)

(72) Inventors: Joseph Julicher, Maricopa, AZ (US); Yong Yuenyongsgool, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/944,772

(22) Filed: Apr. 3, 2018

Related U.S. Application Data

(60) Provisional application No. 62/619,265, filed on Jan. 19, 2018.

(51) Int. Cl.
  *G06F 13/28* (2006.01)
  *G06F 13/10* (2006.01)

(52) U.S. Cl.
  CPC .......... *G06F 13/28* (2013.01); *G06F 13/102* (2013.01)

(58) Field of Classification Search
  CPC ................................ G06F 13/28; G06F 13/102
  See application file for complete search history.

(56) References Cited

U.S. PATENT DOCUMENTS

| | | | |
|---|---|---|---|
| 6,014,717 A | 1/2000 | Bezzant et al. | 710/22 |
| 6,665,748 B1 | 12/2003 | Slater et al. | 710/23 |
| 2006/0174169 A1 | 8/2006 | Inoue et al. | 714/55 |
| 2007/0162650 A1* | 7/2007 | Bruce | G06F 13/28 710/22 |
| 2014/0270253 A1* | 9/2014 | Yuenyongsgool | G06F 1/04 381/98 |
| 2015/0006767 A1* | 1/2015 | Lu | G06F 13/382 710/22 |

OTHER PUBLICATIONS

International Search Report and Written Opinion, Application No. PCT/US2018/013901, 11 pages, dated Apr. 24, 2019.

\* cited by examiner

*Primary Examiner* — Glenn A. Auve
(74) *Attorney, Agent, or Firm* — Slayden Grubert Beard PLLC

(57) ABSTRACT

A processor includes a central processing unit (CPU) and a direct memory access (DMA) adapter circuit. The DMA adapter circuit includes a DMA controller circuit and is configured to interface with a legacy internal hardware peripheral and with a DMA-enabled internal hardware peripheral. The DMA-enabled internal hardware peripheral includes a first special function register (SFR). The legacy internal hardware peripheral includes no DMA features. The CPU is configured to execute a legacy application that accesses a setting in memory through the legacy internal hardware peripheral. Execution of the legacy application includes access by the CPU of the setting in memory. The DMA controller circuit is configured to access the setting in memory during execution of a DMA-enabled application through the DMA-enabled internal hardware peripheral.

18 Claims, 2 Drawing Sheets

ABSTRACT# DIRECT MEMORY ACCESS ADAPTER

PRIORITY CLAIM

The present application claims priority to U.S. Provisional Application No. 62/619,265, filed Jan. 19, 2018, the entirety of which is hereby incorporated by reference.

FIELD OF THE INVENTION

The present disclosure relates to memory management for processors and microcontrollers and, more particularly, to a direct memory access (DMA) adapter for peripherals within the microcontroller or processor.

BACKGROUND

DMA may allow certain hardware subsystems, such as those within a processor or microcontroller, to access main system memory, such as random-access memory (RAM), independent of the CPU. Without DMA, when a CPU uses routines to read or write data, the CPU is typically fully occupied for the entire duration of the read or write operation, and is thus unavailable to perform other work. With DMA, the CPU first initiates the transfer and performs other tasks while the transfer is in progress until an interrupt is received from the DMA controller when the operation is done. DMA is used by various peripherals within processors and microcontrollers, and may be used for tasks such as data writes to and from secondary memory, graphics, networking, or other tasks. DMA may also be used for intra-chip data transfer in multi-core processors. DMA may be also used to copy data within memory itself.

Processors, microcontrollers, microcontroller units (MCU), central processing units (CPU), and other electronic devices may include internal peripherals. These peripherals may include digital or analog circuitry that is available for various parts of the MCU to perform tasks. Such internal peripherals may include, for example, counters, timers, a real-time clock, universal asynchronous receiver-transmitter (UART) interfaces, serial peripheral interfaces (SPI), or I2C interfaces.

SUMMARY

Embodiments of the present disclosure include a DMA adapter circuit. The DMA adapter circuit may include a DMA controller circuit. The DMA adapter circuit may be configured to interface with a legacy internal hardware peripheral and with a DMA-enabled internal hardware peripheral. The peripherals may be internal to a processor, microcontroller, or system in which the DMA adapter circuit is implemented or to which the DMA adapter circuit is communicatively coupled. The DMA-enabled internal hardware peripheral may a first special function register (SFR). The legacy internal hardware peripheral might include no DMA features. The DMA adapter circuit may be implemented in or may be communicatively coupled to a central processing unit (CPU) of a processor, microcontroller, or system in which the DMA adapter circuit is implemented or to which the DMA adapter circuit is communicatively coupled. The CPU may be configured to execute a legacy application. The legacy application may be configured to access a first setting in memory through the legacy internal hardware peripheral. Execution of the legacy application may include access by the CPU of the first setting in memory. The DMA controller circuit may be configured to access the first setting in memory during execution of a DMA-enabled application through the DMA-enabled internal hardware peripheral. In combination with any of the above embodiments, the CPU may be configured to view the first setting as stored in the first SFR in a memory map. In combination with any of the above embodiments, the first SFR is a DMA SFR, the first setting is configured to be stored in the first SFR, and the first SFR is not visible to the CPU. In combination with any of the above embodiments, a second SFR and a third SFR may be implemented in the DMA adapter circuit, wherein the third SFR is a DMA SFR, the legacy internal hardware peripheral is configured to allow the CPU to access a second setting in memory stored in the second SFR during execution of the DMA-enabled application, and the DMA-enabled internal hardware peripheral is configured to allow the DMA controller circuit to access a third setting in memory stored in the third SFR during execution of the DMA-enabled application. In combination with any of the above embodiments, the third SFR is not visible to the CPU. In combination with any of the above embodiments, the second SFR and the third SFR share a same identified address. In combination with any of the above embodiments, the legacy application and the DMA-enabled application are configured to access the first setting in memory at a same identified address. In combination with any of the above embodiments, the legacy application is without DMA functions configured to access the first setting. In combination with any of the above embodiments, the DMA controller circuit is configured to receive an event generated in the DMA-enabled application through a second SFR of the DMA-enabled internal hardware peripheral. In combination with any of the above embodiments, the CPU is configured to receive an event generated by execution of the legacy application and received on a CPU interrupt bus from the legacy internal hardware peripheral.

Embodiments of the present disclosure may include a processor, microcontroller, or system include any of the above DMA adapter circuits.

Embodiments of the present disclosure may include methods performed by any of the DMA adapter circuits, processors, microcontrollers, or systems above.

DETAILED DESCRIPTION

Figure 1:
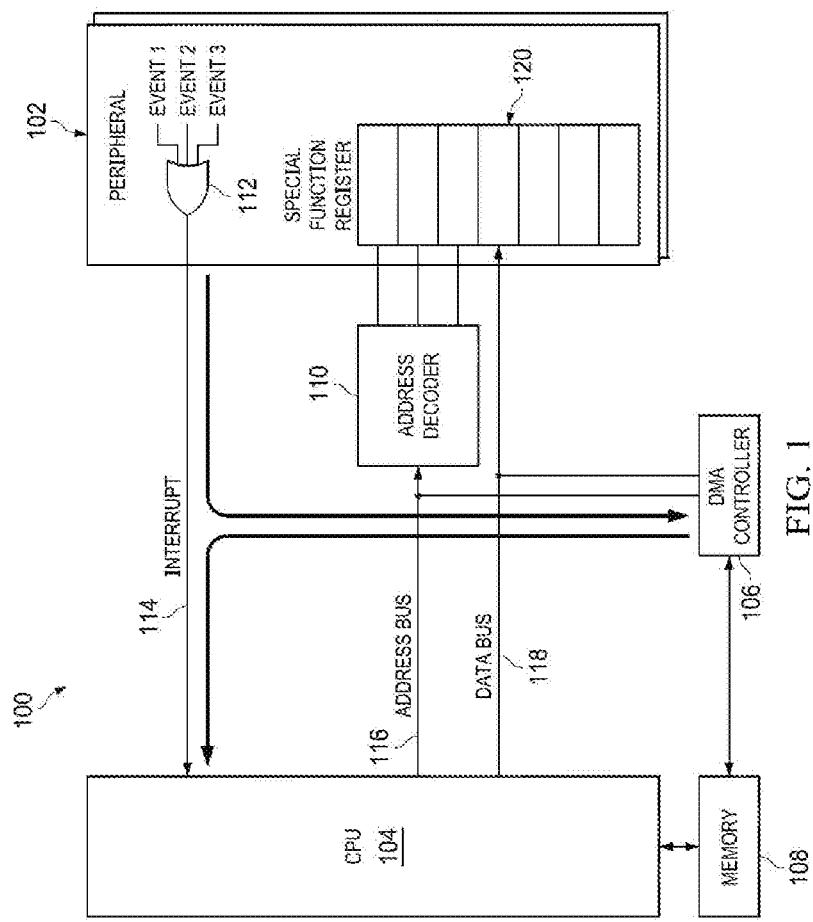
FIG. 1 is an illustration of an example system for a DMA adapter for use with a peripheral, according to embodiments of the present disclosure.
Figure 2:
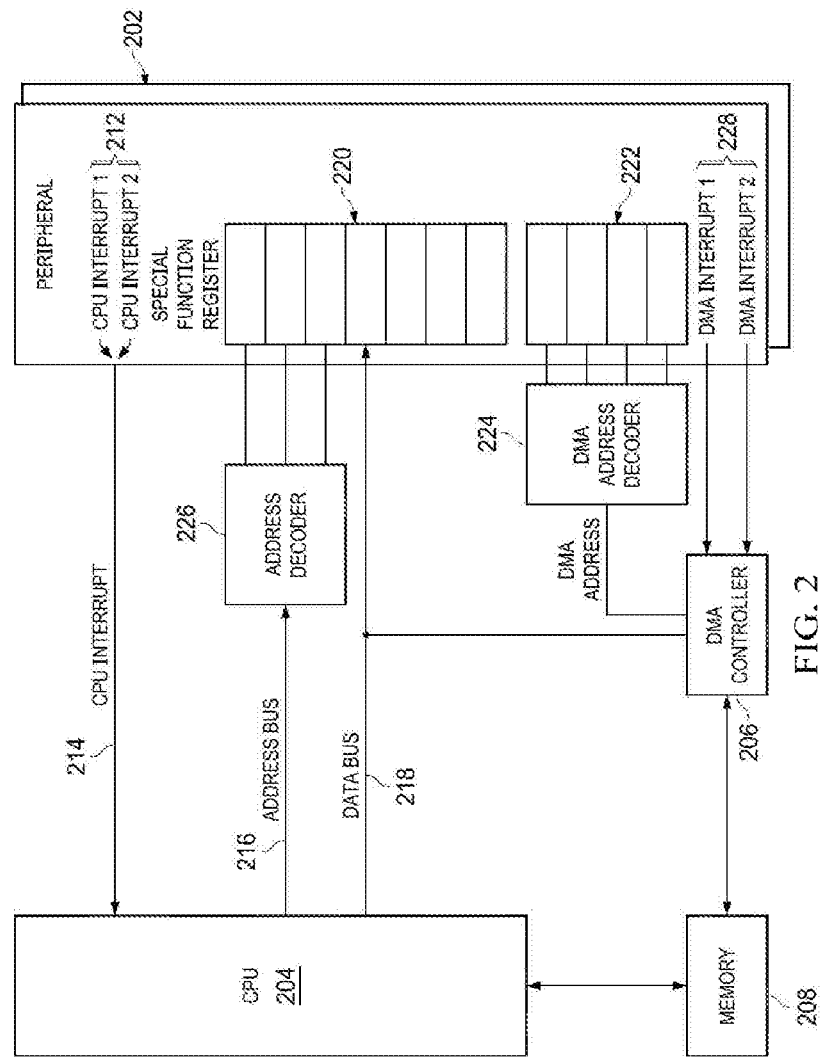
FIG. 2 is an illustration of another example system for a DMA adapter for use with a peripheral, according to embodiments of the present disclosure.

FIGS. 1 and 2 illustrate example systems for a DMA adapter.

In one embodiment, a DMA adapter may include shared access between a CPU and a DMA controller to DMA-based resources such as registers. FIG. 1 illustrates such an example embodiment. In another embodiment, a DMA adapter may include access for a DMA controller to DMA-based resources such as registers, wherein the access is reserved for the DMA controller and is exclusive of access for a CPU. FIG. 2 illustrates such an example embodiment.

In one embodiment, a DMA adapter may facilitate usage of legacy code or legacy peripherals. Software for older peripherals may have been developed using code, commands, instructions, application programming interfaces (APIs), libraries, scripts, functions, or other software with which the peripheral may be used. The software may have been developed with certain code for reading or writing data to and from the peripheral or memory. Such software, running on existing hardware or peripherals, may be stable and verified. The peripherals and software might not include DMA-specific features for reading or writing data to and from the peripheral or memory.

However, newer processors and microcontrollers may be developed with DMA features. Newer peripherals may be developed with DMA capabilities corresponding to the processors and microcontrollers. However, in one embodiment legacy peripherals (without DMA features), legacy peripherals with DMA features added, or legacy software (without DMA features) may be used with newer processors and microcontrollers (that have DMA features). Such an incompatibility may be reconciled through the use of DMA adapters according to the embodiments of the present disclosure. The DMA adapters may allow users to use the same software, function calls, and API functions in new microcontrollers and processors as were used in previous microcontrollers and processors. Furthermore, the DMA adapters may allow users to use legacy peripherals that have added DMA capabilities or features. These legacy peripherals with added DMA capabilities, in conjunction with DMA adapters of the present disclosure, may facilitate new code that uses DMA features along with legacy code that does not use DMA features.

The DMA capabilities may include registers for DMA reads and writes, and creating DMA interrupts to inform a system about the status of DMA operations. The newer peripherals with DMA capabilities may include additional hardware to support the DMA capabilities. The newer peripherals may also be supported with new code, commands, instructions, APIs, libraries, scripts, functions, or other software so that the new DMA features may be utilized. The new software may be utilized by developers of applications to be run on systems with the newer peripherals. Legacy peripherals may be enhanced with DMA-specific features. In one embodiment, legacy code, developed for previous peripherals without DMA functionality, may be enabled to be executed on peripherals with DMA functionality by the DMA adapter.

A peripheral with DMA features may include a data register layout that consolidates data needed for DMA into isolated registers. The registers may be isolated from other registers. A legacy peripheral, built originally without consideration of DMA features, may have compacted its data register layout. For example, a data register in the legacy peripheral might only need six bits, rather than a full eight bits. The remaining two bits may be used for a SFR. This might be incompatible with DMA, as DMA might not be configured to efficiently manipulate data within a given register. Rather, DMA may be optimized or especially suited for moving data in and out of registers without specific sub-register manipulation. The compacted data layout of a legacy peripheral may mix different sizes and sorts of data so that DMA is unable to efficiently extract a single sort or source of data in the manner and speed that DMA may be typically applied. To continue the example of the data register in the legacy peripheral, bits four and five of the eight-bit register may be the two least significant bits of a ten-bit value that represents a pulsed width modulation (PWM) duty cycle. The remaining eight bits may be stored in yet another eight-bit register. To fully implement the PWM duty cycle, the desired ten bits must be split between the eight most significant bits and the two least significant bits. The two least significant bits may be mixed with other leftover bits from other SFRs and written to or read from the register in question. In an application wherein a peripheral is used for power control, if DMA were updating the ten-bit duty cycle automatically (such as in waveform generation), these two bits might be set to a static value. The application using the register might be limited to eight-bit duty cycles with a fixed offset. A newer version of the peripheral could create a new representation of the duty cycle register that did not split the data so as to accommodate DMA access. Using embodiments of the present disclosure, legacy drivers would be able to use the legacy representation while DMA-friendly drivers would use the DMA-enabled representation.

FIG. 1 is an illustration of an example system 100 for a DMA adapter for use with a peripheral, according to embodiments of the present disclosure. In one embodiment, in system 100 a CPU may have access or visibility to the same set of special function registers as a DMA controller.

System 100 may include a central processing unit (CPU) 104 or other processor or processor core. System 100 may include one or more peripherals 102. Furthermore, system 100 may include a DMA adapter. The DMA adapter may be implemented by a DMA controller 106. Furthermore, the DMA adapter may be implemented by an address decoder 110. Address decoder 110 may be configured to convert addresses to peripheral selects. In addition, the DMA adapter may be implemented by one or more special function registers (SFR) 120. The DMA adapter may facilitate DMA operations between CPU 104 and peripheral 102. In particular, the DMA adapter may handle data transfers directly from memory 108 and registers for peripheral 102.

CPU 104 may include any suitable processor, processor core, or other electronic circuitry. System 100 may be implemented in a microcontroller, microprocessor, system-on-a-chip (SoC), or other suitable electronic device. CPU 104 may provide processing and execution of instructions stored on a computer-readable medium. The instructions, when loaded and executed by CPU 104, may provide effective functionality for software applications.

Peripheral 102 may be a peripheral hardware unit built within such a microcontroller, microprocessor, SoC, or other suitable electronic device. Peripheral 102 may provide functionality for still other peripheral devices attached or communicatively coupled to system 100 (not shown). Peripheral 102 may be implemented as a core-independent peripheral (CIP). A CIP may include circuitry and be configured to execute independently of CPU 104. The CIP may receive start or stop commands from CPU 104, may send data to or from CPU 104 via memory 108, or otherwise communicate with CPU 104. However, ongoing operation of the CIP might not require execution of instructions within CPU 104. CPU 104, once configuring the CIP to operate, might allow the CIP to operate independently. The CIP might only need generate interrupts or share data as needed. The CIP may offload execution or handling of certain tasks on behalf of system 100. CIP peripherals may operate without the continuous involvement of a processor. The CIP may, for example, continuously route data to or from system 100 in a serial port. Peripherals may include, for example, analog to digital converters (ADC), UARTs, SPI circuits, PWM circuits, timers, digital ports, comparators, op-amps, or configurable logic cells (CLC). CIPs can include collections of peripherals connected together to operate in concert. An example is a combination of a timer, CLC, PWM, comparator, and op-amp working together to drive or produce a power supply. Once this collection of peripherals is configured, the power supply runs without further CPU involvement.

A DMA can be used to make such a CIP more sophisticated. The power supply CIP might further include a digital port, timer and DMA interface configured to capture the time of a pin change and alert the CPU after the time is captured. End users may combine peripherals to in application-specific solutions such as this. Accordingly, peripherals may be relatively small and interconnections between the peripherals may be provided. Thus, in a microcontroller or other general-purpose system, a larger number of generally-applicable peripherals may be included but the microcontroller, through use of the peripherals, may still be able to implement a sophisticated solution.

The DMA adapter may be implemented in any suitable combination of digital circuitry and memory locations. The memory locations may include suitable registers. In FIG. 1, a DMA adapter may include constituent elements such as DMA controller 106, address decoder 110, and SFRs 120. In various embodiments, SFRs 120 may be implemented within peripheral 102.

The components of the DMA adapter may be implemented along various bus lines between CPU 104 and peripheral 102. DMA controller 106 may be communicatively coupled to memory 108, peripheral 102, and CPU 104.

For example, DMA controller 106 may be configured to reside along an interrupt bus 114. Interrupt bus 114 may communicatively couple peripheral 102 and CPU 104. Interrupt bus 114 may be configured to provide a notification to DMA controller 106 or CPU 104 that an interrupt has occurred within the operation of peripheral 112. The interrupt may originate from interrupt logic 112. Interrupt logic 112 may include a series of possible interrupt events (event1, event2, event3) wherein, upon the occurrence of any such events, an interrupt may be generated to CPU 104. In one embodiment, these events may include DMA-specific events. While CPU 104 may receive a general signal that an interrupt has occurred, a DMA-specific one of the events may be separately routed to DMA controller 106 (not shown).

In another example, DMA controller 106 may be communicatively coupled to registers of peripheral 102 along a data bus 118. DMA controller 106 may be configured to write to and from SFRs 120 and memory 108. Furthermore, CPU 104 may be configured to also write to and from SFRs 120.

In yet another example, DMA controller 106 may be communicatively coupled to address decoder 110 along an address bus 116. Address decoder 110 may be configured to select which of SFRs 120 data is to be written to or from on data bus 118. Address decoder 110 may be configured to be controlled by both CPU 104 or DMA controller 106.

FIG. 2 is an illustration of another example system 200 for a DMA adapter for use with a peripheral, according to embodiments of the present disclosure. In one embodiment, in system 200 a DMA controller may have access or visibility to a set of SFRs that are not visible or not accessible to a CPU.

System 200 may include a CPU 204 or other processor or processor core. System 200 may include one or more peripherals 202. Furthermore, system 200 may include a DMA adapter. The DMA adapter may be implemented by a DMA controller 206. Furthermore, the DMA adapter may be implemented by a DMA address decoder 224. In addition, the DMA adapter may be implemented by one or more special function registers (SFR) 222. The DMA adapter may facilitate DMA operations between CPU 204 and peripheral 202. In particular, the DMA adapter may handle data transfers directly from memory 208 and registers for peripheral 202.

CPU 204 may include any suitable processor, processor core, or other electronic circuitry. System 200 may be implemented in a microcontroller, microprocessor, system-on-a-chip (SoC), or other suitable electronic device. CPU 204 may provide processing and execution of instructions stored on a computer-readable medium. The instructions, when loaded and executed by CPU 204, may provide effective functionality for software applications.

Peripheral 202 may be a peripheral hardware unit built within such a microcontroller, microprocessor, SoC, or other suitable electronic device. Peripheral 202 may provide functionality for still other peripheral devices attached or communicatively coupled to system 200 (not shown). Peripheral 202 may be implemented as a CIP.

The DMA adapter may be implemented in digital circuitry, analog circuitry, instructions for execution by a processor, memory locations such as registers, or any suitable combination thereof. These may include constituent elements such as DMA controller 206, DMA address decoder 224, and SFRs 222. In various embodiments, SFRs 222 may be implemented within peripheral 202.

The components of the DMA adapter may be implemented along various bus lines between CPU 204 and peripheral 202. DMA controller 206 may be communicatively coupled to memory 208, peripheral 202, and CPU 204.

For example, DMA controller 206 may be communicatively coupled to registers of peripheral 202 along a data bus 218. In particular, DMA controller 206 may be communicatively coupled to SFRs 220 of peripheral 202 along data bus 218. Furthermore, DMA controller 206 may be communicatively coupled to SFRs 222. DMA controller 206 may be communicatively coupled to SFRs 222 along data bus 218 or another data bus (not shown). In one embodiment, DMA controller 206 may be configured to write to and from SFRs 220 and memory 108. Furthermore, CPU 104 may be configured to write to and from SFRs 220. In another embodiment, DMA controller 206 may be configured to write to and from SFRs 222 and memory 108.

In another example, in one embodiment DMA controller 206 may be communicatively coupled to DMA address decoder 224. DMA address decoder 224 may be configured to select which of SFRs 222 data is to be written to or from with respect to DMA controller 206 and memory 208. System 200 may include an address decoder 226 coupled to CPU 204 along address bus 216. Address decoder 226 may be configured to select which of SFRs 220 are to be written to or from with respect to CPU 204. In another embodiment, DMA controller 206 may be communicatively coupled to address decoder 226. Address decoder 226 may be configured to select which of SFRs 220 are to be written to or from with respect to DMA controller 206 and memory 208 in such an embodiment. In such another embodiment, both DMA controller 206 and CPU 204 may be configured to control or otherwise use address decoder 226. However, in an alternative embodiment, DMA controller 206 might not be communicatively coupled to address decoder 226 and might not have access to SFRs 220. In another embodiment, CPU 204 might not have access to DMA address decoder 224 or to SFRs 222.

In yet another example, DMA controller 206 may be configured to receive DMA interrupts 228 from peripheral

202. In such an example, DMA interrupts 228 might not be passed through other interrupt logic 212 along a CPU interrupt bus 214. CPU 204 may be configured to receive general interrupts, other than DMA interrupts 228, from interrupt logic 212 along CPU interrupt bus 214. Interrupt logic 212 may logically combine one or more non-DMA interrupts and send an indication of the logical combination to CPU 204

Comparing system 100 of FIG. 1 and system 200 of FIG. 2, in one embodiment system 200 may implement access to DMA-specific SFRs that are unavailable to CPU 204 but are available to DMA controller 206. Given a DMA task, DMA controller 206 may perform such DMA tasks through writing and reading to SFRs that are not otherwise visible or accessible to CPU 204. Such SFRs may include, for example, SFRs 222. Address decoder 226, accessible by CPU 204 to access constituent elements of peripheral 202, might not include address mappings for SFRs 222. Address decoder 226 might only include address mappings for SFRs 220. Out of a pool of SFRs for peripheral 202, the pool of SFRs may be divided into SFRs 220 and SFRs 222. In one embodiment, SFRs 222 might only be visible or available to DMA controller 206, and not otherwise to CPU 204. In another embodiment, SFRs 220 might only be visible or available to CPU 204, and not otherwise to DMA controller 206. In an alternative embodiment, SFRs 220 might be visible or available to both CPU 204 and to DMA controller 206, but SFRs 222 might not be visible or available to CPU 204.

System 100 of FIG. 1 may be configured to implement a scenario wherein software running on CPU 104 is configured to access peripheral 102 optionally with or without DMA capability. Furthermore, system 200 of FIG. 2 may be configured to also implement a scenario wherein software running on CPU 204 is configured to access peripheral 202 optionally with or without DMA capability. System 100 may implement optional DMA capability with shared SFRs 120 between CPU 104 and DMA controller 106, wherein SFRs 120 include DMA-access SFRs. System 200 may implement optional DMA capability with SFRs 222 accessible or visible to DMA controller 206 but not accessible or not visible to CPU 204.

In system 200, SFRs 222 might not be accessible or not visible to CPU 204 in that addresses of SFRs 222 may be mapped in decoding hardware, such as DMA access decoder 224, that is reserved for use by DMA controller 206 but not CPU 204. In contrast, in system 100 the overall pool of SFRs 120 may be shared by CPU 104 and DMA controller 106. Nevertheless, software running in system 200 may be able to make use of DMA operations. A DMA-based operation may be defined in API or other software as a possible mechanism for writing data to or from memory. In particular, a peripheral 202 to which data is to be written to or from memory using DMA may be accessed with software specific to DMA.

In one embodiment, peripherals 102, 202 may include a peripheral configured to work with DMA, including DMA-specific features. In a further embodiment, peripherals 102, 202 may include a legacy peripheral that includes DMA-specific features added to the legacy peripherals, such as DMA SFRs. Such DMA SFRs must be visible to DMA controllers. Such DMA SFRs may or may not be visible to the CPU, depending upon the embodiment and implementation. Original registers must be visible to the CPU. In another embodiment, peripherals 102, 202 may include a legacy peripheral that was developed without DMA-specific features. In such an embodiment, peripherals 102, 202 may include a legacy peripheral that is configured to be executed with legacy software code that does not invoke DMA-specific features.

In legacy software and peripherals without DMA functionality, a single interrupt may be available for all events in the peripheral. These events may include send, receive, error, done, or other peripherals. An interrupt may be generated when, for example, data to be sent has completed. Such a single interrupt may be inappropriate for DMA because the interrupt otherwise interrupts the CPU unnecessarily, thereby defeating a key feature of DMA. For example, if an interrupt that is DMA-based is sent over CPU interrupt bus 214 or interrupt bus 114 to respective CPUs, the respective CPU may have to pause its execution of different applications to handle the interrupt. In contrast, if a DMA-based interrupt from interrupt logic 228 is sent directly to a respective DMA controller 206, DMA controller 206 may be able to handle the interrupt and move on to other data movement tasks while the respective CPU 204 executes in parallel without interruption. In such a case, the system may offload data movement to respective DMA controllers from respective CPUs.

Thus, while legacy peripherals may collect events into a single interrupt, DMA-based systems may use multiple, specific interrupts as trigger events, each with separate lines or busses. If the legacy peripheral approach is used with DMA, too many events may be compiled on a single interrupt. For example, if the events gathered by interrupt logic 112 collectively include an asserted interrupt, a second step must be performed to parse the events included to determine which event has occurred. Only then may the event be handled. In such a case, the DMA operation cannot be separated from CPU operations. A DMA-based interrupt would require parsing and handling by the CPU. Similarly, merely routing such a collected interrupt 114 to a DMA controller such as DMA controller 106 may be inappropriate, as DMA controller 106 might not be able to parse an interrupt signal that indicates one of many possible events has occurred. For example, DMA operations cannot handle error conditions or housekeeping operations. In addition, peripherals may use SFRs that are not designed correctly for optimum DMA use. For example, a register may include auxiliary data or configuration information in part of a word, surrounded by otherwise core data information. In one example, a pulse-width modulation duty cycle may be defined by eight bits but stored in a register that is ten bits wide. The eight most significant bits may be used to define the duty cycle. The remaining two bits may be used for another purpose. DMA would require partial writes to accomplish data transfer to or from such a register. Embodiments of the present disclosure may instead require a separate interrupt for DMA send, a separate interrupt for DMA receive, and separate interrupts for still other DMA operations. Other events may be carried on a shared interrupt, such as events originating from legacy peripherals.

Embodiments of the present disclosure may include DMA-specific registers that provide a data or event interface for DMA operations. These may be implemented by a portion of SFRs 120 or SFRs 222. If a peripheral is to use DMA events, data may be loaded to or from such SFRs upon a DMA interrupt. If peripheral 202 is a legacy peripheral whose code does not use DMA, SFRs 222 may be ignored or inaccessible. If peripheral 102 is a legacy peripheral whose code does not use DMA, any DMA-specific SFRs of SFRs 120 may be ignored or otherwise repurposed for other SFR tasks. If peripheral 202 is a new peripheral or a legacy peripheral enabled with DMA-capable features and software, peripheral 202 may make use of SFRs 222. If peripheral 102 is a new peripheral or a legacy peripheral enabled with DMA-capable features and software, peripheral 102 may make use of all of SFRs 120.

For example, peripheral 102 or peripheral 202 may be a peripheral internal to a processor or microcontroller. Peripheral 102 or peripheral 202 may be configured to perform synchronous serial communications, such as I2C, SPI, or MSMP, on behalf of the processor or microcontroller. The serial communications may be offloaded to such a peripheral. The DMA adapter may allow DMA functions to be called by software using a new API to access peripheral 102 or peripheral 202 using DMA features. The same DMA adapter may also handle prior, non-DMA functions called by legacy software. The legacy software may be configured to make calls to legacy peripherals that do not include DMA features. Nevertheless, peripheral 102 or peripheral 202 as-equipped with DMA features may be able to execute such legacy software. Thus, system 100 and system 200 may be able to handle DMA code and non-DMA code.

As shown in FIG. 1, in one embodiment, DMA-specific SFRs of SFRs 120 may be added to a memory map of CPU 104. Thus, the DMA-specific SFRs are included within the domain or range of memory locations that CPU 104 can access. This is accomplished by an address decoder 110 that may be shared by both CPU 104 and DMA controller 106. If legacy SFR registers remain within the memory map of SFRs 120, then legacy code may continue to operate correctly. In another embodiment, the new SFR registers may be used for both DMA and CPU operations. New software, using the newly available API, may access DMA functions using the DMA-specific SFRs. However, the SFR registers may consumer SFR space, which may be limited.

As shown in FIG. 2, in another embodiment, the DMA-specific SFRs 222 may be addressable and accessed by DMA address decoder 224, accessible to DMA controller 206 and not directly to CPU 204. Thus, SFRs 222 might only be accessible to tasks offloaded from CPU 204 to DMA controller 206. Such offloading may be performed by software utilizing APIs with DMA-based commands. DMA-based addresses in FIG. 2 are in a different memory map than those used directly by CPU 204.

Nevertheless, some SFRs 220 may be common to both CPU 204 and DMA controller 206. In such a case, DMA controller 206 may use address decoder 226 to access such SFRs 220. Programmers of software may access SFRs 220 that are common to both CPU 204 and DMA controller 206. Accordingly, definitions of shared SFRs 220 should be defined in APIs using the same address, label, and other documentation between DMA-specific and CPU-specific function calls and addressing conventions. Similarly, SFRs 120 that are to be shared between CPU 104 and DMA controller 106 should share addresses and documentation between DMA-specific and CPU-specific function calls and addressing conventions. For example, if peripheral 102 or peripheral 202 include a data register that, in the view of CPU 104 or CPU 104, is addressed at address 10—then the same data register should also be addressed at address 10 in terms of the view of DMA controller 106 or DMA controller 206. The two addressed registers may be implemented as a single register.

Returning to the duty cycle example from above, wherein a ten-bit register includes duty cycle data including eight bits for the duty cycle and two bits for additional information used for other purposes, a new SFR that is eight bits may be defined in an API for DMA access. The SFR may be included in SFRs 120 or SFRs 220. The code may read and write data from the new SFR, and DMA may be used to copy this SFR. The same peripheral may also handle existing, previously written functions accessing the previously used ten-bit register. The previously used ten-bit register may be accessed by CPU 104 or CPU 204 and decoded by address decoder 110 or address decoder 226. The previously used ten-bit register and the new SFR may be addressed using the same address identifier. When used in DMA, the new SFR may be decoded by address decoder 110 in FIG. 1 but by DMA address decoder 224 in FIG. 2.

A new peripheral with DMA capabilities, implementing peripheral 102 or peripheral 202, may be configured to generate CPU interrupts and DMA interrupts. In contrast to previous peripherals, the new peripheral may separately generate different CPU interrupts for different events, rather than allowing multiple kinds of events to all generate a single interrupt.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

The invention claimed is:

1. A processor, comprising:
   a central processing unit (CPU); and
   a direct memory access (DMA) adapter circuit, wherein:
      the DMA adapter circuit includes a DMA controller circuit;
      the DMA adapter circuit is configured to interface with a legacy internal hardware peripheral and with a DMA-enabled internal hardware peripheral;
      the DMA-enabled internal hardware peripheral includes a first special function register (SFR);
      the legacy internal hardware peripheral includes no DMA features;
      the CPU is configured to execute a legacy application, the legacy application configured to access a first setting in memory through the legacy internal hardware peripheral, wherein execution of the legacy application includes access by the CPU of the first setting in memory; and
      the DMA controller circuit is configured to access the first setting in memory during execution of a DMA-enabled application through the DMA-enabled internal hardware peripheral.

2. The processor of claim 1, wherein the CPU is configured to view the first setting as stored in the first SFR in a memory map.

3. The processor of claim 1, wherein:
   the first SFR is a DMA SFR;
   the first setting is configured to be stored in the first SFR; and
   the first SFR is not visible to the CPU.

4. The processor of claim 1 further comprising a second SFR and a third SFR in the DMA adapter circuit, wherein:
   the third SFR is a DMA SFR;
   the legacy internal hardware peripheral is configured to allow the CPU to access a second setting in memory stored in the second SFR during execution of the DMA-enabled application; and the DMA-enabled internal hardware peripheral is configured to allow the DMA controller circuit to access a third setting in memory stored in the third SFR during execution of the DMA-enabled application;

the third SFR is not visible to the CPU.

5. The processor of claim 4, wherein the second SFR and the third SFR share a same identified address.

6. The processor of claim 1, wherein the legacy application and the DMA-enabled application are configured to access the first setting in memory at a same identified address.

7. The processor of claim 1, wherein the legacy application is without DMA functions configured to access the first setting.

8. The processor of claim 1, wherein the DMA controller circuit is configured to receive an event generated in the DMA-enabled application through a second SFR of the DMA-enabled internal hardware peripheral.

9. The processor of claim 8, wherein the CPU is configured to receive an event generated by execution of the legacy application and received on a CPU interrupt bus from the legacy internal hardware peripheral.

10. A method, comprising:
determining that an internal hardware peripheral is connected to a central processing unit (CPU) and a DMA controller circuit;
determining whether the internal hardware peripheral is a legacy internal hardware peripheral or a DMA-enabled internal hardware peripheral, the DMA-enabled internal hardware peripheral to access a first special function register (SFR);
based on a determination that the internal hardware peripheral is a legacy internal hardware peripheral, executing a legacy application, wherein:
the legacy application is configured to access a first setting in memory through the legacy internal hardware peripheral; and
execution of the legacy application includes access by the CPU of the first setting in memory; and
based on a determination that the internal hardware peripheral is a DMA-enabled internal hardware peripheral, executing a DMA-enabled application, wherein:

the DMA-enabled application is configured to access the first setting in memory through the DMA-enabled internal hardware peripheral; and
execution of the legacy application includes the CPU accessing the first setting in memory with the DMA controller circuit.

11. The method of claim 10, further comprising:
storing the first setting in the first SFR;
including the first SFR in a memory map; and
viewing, from the CPU, the first setting as stored in the first SFR in a memory map.

12. The method of claim 10, wherein:
the first SFR is a DMA SFR;
the first setting is configured to be stored in the first SFR; and
the first SFR is not visible to the CPU.

13. The method of claim 10, further comprising:
accessing, by the CPU, a second SFR;
accessing, by the controller circuit, a third SFR, wherein the third SFR is a DMA SFR;
allowing access from the CPU to a second setting stored in the second SFR during execution of the DMA-enabled application; and
allowing access from the DMA controller circuit to a third setting in the third SFR during execution of the DMA-enabled application;
wherein the third SFR is not visible to the CPU.

14. The method of claim 13, wherein the second SFR and the third SFR share a same identified address.

15. The method of claim 10, further comprising accessing, with the legacy application and the DMA-enabled application, the first setting in memory at a same identified address.

16. The method of claim 10, further comprising executing the legacy application without DMA functions to access the first setting.

17. The method of claim 10, further comprising receiving an event generated in the DMA-enabled application through a second SFR of the DMA-enabled internal hardware peripheral.

18. The method of claim 10, further comprising receiving an event through the CPU, the event generated in the legacy application and received on a CPU interrupt bus from the legacy internal hardware peripheral.

* * * * *